（12）United States Patent
Michels et al.

(10) Patent No.: US 11,073,110 B2
(45) Date of Patent: Jul. 27, 2021

(54) FUEL SUPPLY SYSTEM FOR THE ACTIVE PURGING OF AN ANTECHAMBER OF A SPARK-IGNITION INTERNAL COMBUSTION ENGINE, USING FUEL VAPOR OR A FUEL VAPOR/AIR MIXTURE, WITH THE AID OF A FUEL EVAPORATOR UPSTREAM FROM THE ANTECHAMBER

(71) Applicant: Volkswagen Aktiengesellschaft, Wolfsburg (DE)

(72) Inventors: Karsten Michels, Magdeburg (DE); Dirk Hagelstein, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/011,600

(22) Filed: Sep. 3, 2020

(65) Prior Publication Data

US 2021/0062766 A1 Mar. 4, 2021

(30) Foreign Application Priority Data

Sep. 3, 2019 (DE) ...................... 10 2019 123 537.5

(51) Int. Cl.
| | |
|---|---|
| *F02M 21/06* | (2006.01) |
| *F01P 3/20* | (2006.01) |
| *F02B 19/12* | (2006.01) |
| *F02B 43/04* | (2006.01) |
| *F02M 21/02* | (2006.01) |
| *F02M 21/04* | (2006.01) |

(52) U.S. Cl.
CPC ............... *F02M 21/06* (2013.01); *F01P 3/20* (2013.01); *F02B 19/12* (2013.01); *F02B 43/04* (2013.01); *F02M 21/0245* (2013.01); *F02M 21/04* (2013.01); *F01P 2060/18* (2013.01)

(58) Field of Classification Search
CPC .... F02M 21/06; F02M 21/0245; F02M 21/04; F01P 3/20; F01P 2060/18; F02B 19/12; F02B 43/04
USPC .................................................. 123/274, 60
See application file for complete search history.

(56) References Cited

U.S. PATENT DOCUMENTS

| | | | | |
|---|---|---|---|---|
| 3,508,530 | A | * 4/1970 | Clawson | ............. F02B 19/1085 123/275 |
| 4,315,490 | A | * 2/1982 | Webber | ................... F02B 43/00 123/275 |
| 4,831,982 | A | * 5/1989 | Baranescu | ............. F02M 45/08 123/275 |
| 5,555,868 | A | 9/1996 | Neumann | |
| 6,739,289 | B2 | 5/2004 | Hiltner et al. | |

(Continued)

FOREIGN PATENT DOCUMENTS

| | | |
|---|---|---|
| CH | 683938 A5 | 6/1994 |
| DE | 69228131 T2 | 9/1999 |

(Continued)

*Primary Examiner* — Mahmoud Gimie
(74) *Attorney, Agent, or Firm* — Muncy, Geissler, Olds & Lowe, P.C.

(57) ABSTRACT

A fuel supply system for the active purging of at least one antechamber of a spark-ignition internal combustion engine, using a gaseous fuel, the internal combustion engine comprising at least one main combustion chamber, which is connected to the at least one antechamber at least on the fuel side. An evaporator is disposed upstream from the at least one antechamber.

19 Claims, 1 Drawing Sheet

(56) References Cited

U.S. PATENT DOCUMENTS

| | | |
|---|---|---|
| 8,910,612 B2 | 12/2014 | Woo et al. |
| 2006/0278195 A1 | 12/2006 | Hotta et al. |
| 2012/0060935 A1* | 3/2012 | Carter ................. F17C 3/00 137/14 |
| 2018/0038269 A1* | 2/2018 | Willi ................. F02B 19/18 |
| 2018/0363539 A1* | 12/2018 | Shelby ............. F02B 19/108 |
| 2020/0240321 A1 | 7/2020 | Bertsch |

FOREIGN PATENT DOCUMENTS

| | | | |
|---|---|---|---|
| DE | 102004043143 A1 | 5/2006 | |
| DE | 102012107242 A1 | 8/2013 | |
| DE | 102014103763 A1 * | 10/2014 | ......... F02M 21/0275 |
| DE | 102017130984 A1 | 4/2018 | |
| DE | 102019001163 A1 | 4/2019 | |
| DE | 102018113239 A1 * | 12/2019 | ............. F02M 31/18 |
| DE | 102019210069 A1 | 1/2020 | |
| WO | WO2019068484 A1 | 4/2019 | |

\* cited by examiner

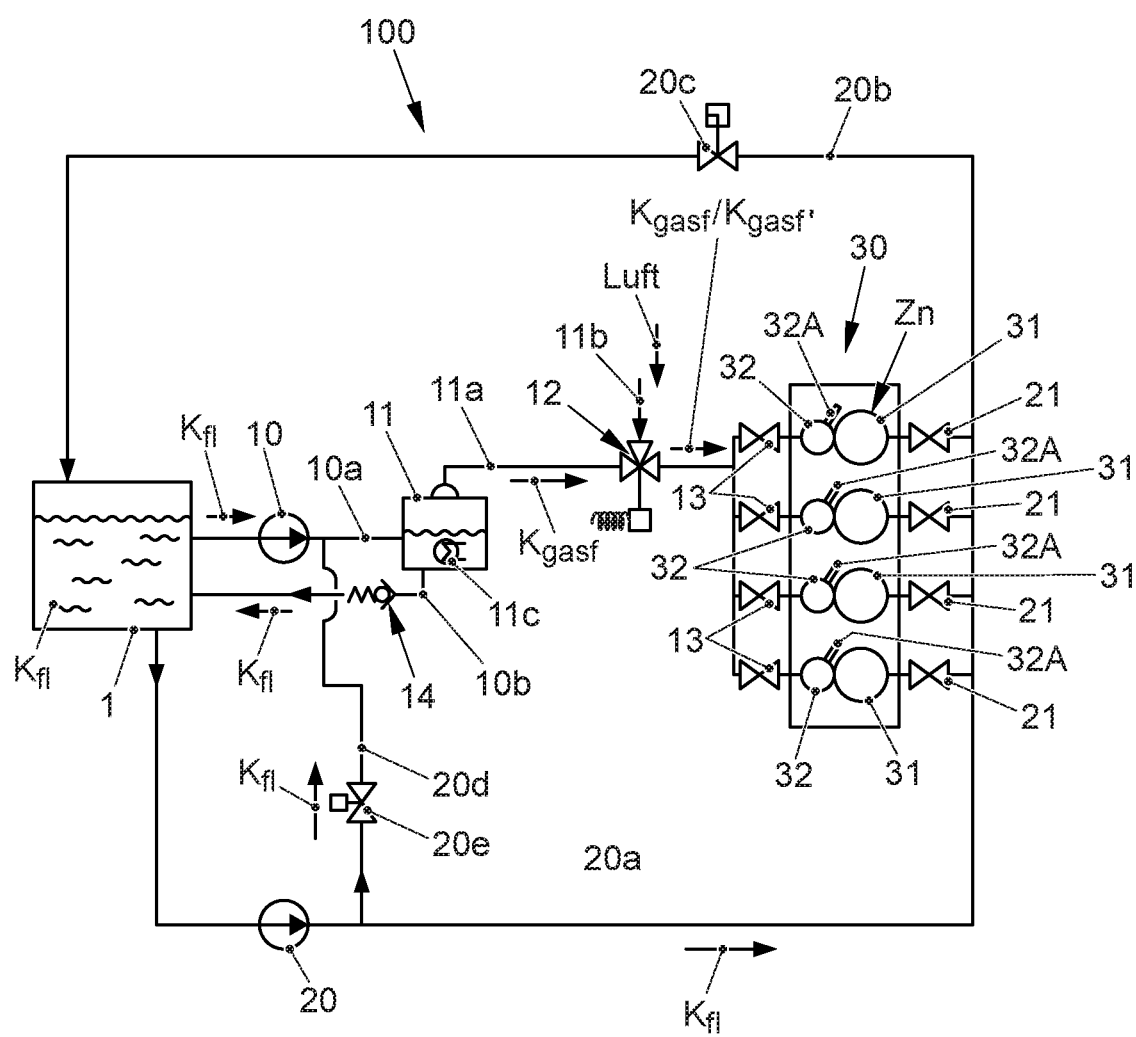

FUEL SUPPLY SYSTEM FOR THE ACTIVE PURGING OF AN ANTECHAMBER OF A SPARK-IGNITION INTERNAL COMBUSTION ENGINE, USING FUEL VAPOR OR A FUEL VAPOR/AIR MIXTURE, WITH THE AID OF A FUEL EVAPORATOR UPSTREAM FROM THE ANTECHAMBER

This nonprovisional application claims priority under 35 U.S.C. § 119(a) to German Patent Application No. 10 2019 123 537.5, which was filed in Germany on Sep. 3, 2019, and which is herein incorporated by reference.

BACKGROUND OF THE INVENTION

Field of the Invention

The present invention relates to a fuel supply system for the active purging of an antechamber of a spark-ignition internal combustion engine, using fuel vapor or a fuel vapor/air mixture.

Description of the Background Art

The publications CH 683 938 A5 and DE 692 28 131 T2 (which corresponds to U.S. Pat. No. 5,555,868) form the generic prior art, in that antechambers or antechamber-like zones are disclosed in the publications. The publications WO 2019/068484 A1 and DE 10 2004 043 143 A1 explain the fuel supply in antechambers of antechamber spark plugs. A purging of the antechamber, using at least fuel and fresh gas comprising air, is disclosed in the publication WO 2019/068484 A1 (which corresponds to US 2020/0240321), so that an ignitable fuel/air mixture is accommodated in the antechamber at the ignition point in time.

SUMMARY OF THE INVENTION

It is therefore an object of the present invention to provide a fuel supply system and an associated method for the active purging of an antechamber of a spark-ignition internal combustion engine.

The starting point of the invention is a fuel supply system for the active purging of at least one antechamber of a spark-ignition internal combustion engine, using a gaseous fuel, the internal combustion engine comprising at least one main combustion chamber, which is connected to the at least one antechamber at least on the fuel side.

According to an exemplary embodiment of the invention, it is provided that an evaporator can be disposed upstream from the at least one antechamber.

The evaporator of the fuel supply system can be disposed between a feed pump for exclusively supplying the at least one antechamber with gaseous fuel and at least one antechamber, the fuel supply system further comprising a high-pressure pump for exclusively supplying the at least one main combustion chamber with liquid fuel.

The evaporator can be arranged between a high-pressure pump and the at least one antechamber for supplying the at least one antechamber with gaseous fuel, the high-pressure pump also being used to supply the at least one main combustion chamber with liquid fuel, so that a supply line to the evaporator branches from the supply line to the at least one main combustion chamber downstream from the high-pressure pump.

The evaporator can be provided with a heating apparatus for evaporating the liquid fuel or is connected to a heating apparatus for supplying heat.

The evaporator can be provided with a separate heating apparatus.

The evaporator can be coupled into a preheating apparatus of the internal combustion engine for the cold start.

The evaporator can be designed in the form of a heat exchanger, the heat being removed from a cooling water of the internal combustion engine and supplied to the evaporator.

The fuel supply system can be designed in such a way that a regulating mixing valve is disposed between the evaporator and the at least one antechamber, via which another gaseous fluid, in particular air, may be supplied to the gaseous fuel evaporated in the evaporator, so that either unmixed gaseous fuel or a fuel vapor/air mixture may be advantageously supplied to the at least one antechamber in a predefinable mixing ratio.

An aspect of the method according to the invention is the active purging of at least one antechamber of a spark-ignition internal combustion engine with a gaseous fuel, using the fuel supply system, the internal combustion engine comprising at least one main combustion chamber, which is connected to the at least one antechamber at least on the fuel side, it being provided according to the invention that liquid fuel is evaporated in an evaporator before the fuel is supplied to the at least one antechamber and is supplied to the one antechamber unmixed or mixed with air, the evaporator being disposed upstream from the at least one antechamber.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawings which are given by way of illustration only, and thus, are not limitive of the present invention, and wherein the sole FIGURE schematically shows a fuel supply system for the active purging of an antechamber of an internal combustion engine, in particular a spark-ignition internal combustion engine, using fuel vapor or a fuel vapor/air mixture, with the aid of a fuel evaporator upstream from the antechamber.

DETAILED DESCRIPTION

In the FIGURE, an arrangement of a fuel evaporator 11 is illustrated for the active purging of an antechamber 32 arranged for each cylinder $Z_n$ within a fuel supply system 100 of a spark-ignition internal combustion engine 30, using a gaseous gasoline fuel, a timed injection of gaseous fuel $K_{gasf}$, which is evaporated in fuel evaporator 11, taking place into particular antechamber 32 via frequency valves 13 assigned to each cylinder $Z_n$.

According to the invention, the method is generally characterized by the active purging of antechamber(s) 32, which according to the invention is carried out using gaseous fuel $K_{gasf}$, which is evaporated in fuel evaporator 11.

Gaseous fuel $K_{gasf}$ is actively ignited in particular antechamber 32 with the aid of a spark ignition device 32A, as is also schematically illustrated in the FIGURE.

An ignition (ante)chamber charge, which is ignited with the aid of spark ignition device 32A, is supplied to particular active antechamber 32 via frequency valves 13.

The main combustion chamber charge is then ignited with the aid of the reactive burning gas jet(s) (flames) generated in particular antechamber 32, which emerge(s) from particular antechamber 32 into the main combustion chamber or main combustion chambers 31.

After the burn-off of the ignited ignition (ante)chamber charge, another ignition (ante)chamber charge is supplied and ignited, so that the existing residual gas in particular antechamber 32 is actively purged from particular antechamber 32 into main combustion chamber 31, the process described above being repeated accordingly during the operation of internal combustion engine 30.

The reactive burning gas jets (flames) generated in antechamber 32 with the aid of the ignition (ante)chamber charges thus enter main combustion chamber 31 of internal combustion engine 30 via at least one opening and ignite the main combustion charge supplied to particular main combustion chambers 31.

For purging active antechambers 32 using gaseous fuel $K_{gasf}$ (fuel vapor) or a fuel vapor/air mixture $K_{gasf'}$, fuel evaporator 11 is supplied, starting from liquid fuel $K_{fl}$ in tank 1, which is preferably electrically heated by the engine cooling water (in a heat exchanger design) or by a preheating apparatus for the cold start or a separate heating apparatus. Fuel evaporator 11 is supplied with liquid fuel $K_{fl}$ from tank 1 via a supply line 10a.

Heating apparatus 11c is schematically illustrated in the FIGURE in one of the embodiments mentioned above by way of example and identified by reference numeral 11c.

Liquid fuel $K_{fl}$ is supplied to fuel evaporator 11 by a feed pump 10, which according to the invention generates the necessary pressure level of the injection pressure of the ignition (ante)chamber charges.

Liquid fuel $K_{fl}$ is evaporated within fuel evaporator 11 and is thus present in gaseous phase $K_{gasf}$ and is supplied via supply line 11a to frequency valves 13, which are connected upstream from antechambers 32.

Fuel vapor $K_{gasf}$ is removed from fuel evaporator 11 and, in one design variant, supplied unmixed to the injection system of fuel supply system 100, in particular to frequency valves 13.

In another design variant, fuel vapor $K_{gasf}$ is mixed with a gaseous fluid, in particular air, via a regulating mixing valve 12, so that an air/fuel vapor mixture $K_{gasf'}$ is formed, regulating mixing valve 12 being disposed in supply line 11a between fuel evaporator 11 and frequency valves 13.

Depending on the design variant, it is therefore advantageously possible to inject pure fuel vapor $K_{gasf}$ or fuel/air mixture $K_{gasf'}$, with the aid of regulating mixing valve 12, to which, in particular, air is supplied via a supply line 11b, into active antechamber(s) 32.

To prevent fuel vapor $K_{gasf}$ in evaporator 11 to become too greatly depleted of volatile components, a return value 14 is disposed in a return line 10b for conducting a predefinable quantity of liquid fuel $K_{fl}$ back into tank 1.

According to the illustration in the FIGURE, return valve 14 may be designed as an overpressure valve or as a frequency valve.

An advantage of the described procedure and the described system is that, by supplying evaporator 100 with liquid fuel $K_{fl}$, much less driving energy is needed for feed pump 10, compared to a compression of an fuel already present in gaseous form to the pressure level in antechambers 32.

The pressure needed in antechambers 32 must be higher at the point in time of introducing the particular ignition (ante)chamber charge for purging antechambers 32 than the pressure of the main combustion chamber charge in main combustion chambers 31.

Feed pump 10 may also advantageously remove liquid fuel $K_{fl}$ upstream from a high-pressure pump 20 of fuel supply system 100, so that tank 1 does not require a separate connection for feed pump 10.

In addition, the FIGURE shows a high-pressure pump 20, with the aid of which liquid fuel $K_{fl}$ is supplied from tank 1 via a supply line 20a to main combustion chambers 31 of internal combustion engine 30 via injection valves 21, for the purpose of introducing or injecting the main combustion chamber charge(s) into liquid fuel $K_{fl}$ in main combustion chambers 31.

According to the FIGURE, excess liquid fuel $K_{fl}$ is supplied back to tank 1 via a return line 20b, in which a volume control valve 20c is disposed.

Also, the liquid fuel $K_{fl}$ may be removed downstream from high-pressure pump 20 via supply line 20d for supplying fuel evaporator 11 according to the FIGURE, in which case an additional feed pump 10 may be dispensed with.

A corresponding pressure control valve 20e may be disposed in supply line 20d, which correspondingly reduces and thus relieves the pressure of high-pressure pump 20 to the predefinable evaporator pressure of fuel evaporator 11.

Fuel supply system 100 is configured to carry out the method according to the invention for purging an active antechamber for gasoline engines, using fuel vapor or a fuel vapor/air mixture, with the aid of a fuel evaporator. For this purpose, fuel supply system (100) comprises, in particular, at least one control unit (engine control unit), in which a computer-readable program algorithm is stored for carrying or the method, and possibly characteristic maps. The control unit controls and regulates the aforementioned controllable and regulatable components.

Fuel supply system 100 according to this invention may be part of a fuel supply and ignition system, which is used in combination with a gas combustion method, which has an increased lean-mixture drivability.

Liquefied natural gas is currently gaining center stage as liquid fuel $K_{fl}$ in tank 1 for an internal combustion engine 30, in particular a gas internal combustion engine. It is provided to design the gas internal combustion engine with antechambers 32 and main combustion chambers 31 and to assign the fuel supply system explained above to the gas internal combustion engine. In other words, fuel supply system 100 and the method relate to liquid gasoline, in particular, as liquid fuel $K_{fl}$, as well as liquid gases, in particular natural gas, which is stored in liquid form in a tank 1 of fuel supply system 100 for a use in gas internal combustion engines.

It is already known to purge antechambers using an ignition (ante)chamber charge of pure gaseous fuel $K_{gasf}$. The invention proposes an approach with the aid of an integrated fuel evaporator 11, which, together with the explained components of the fuel supply system, ensures a provision of the unmixed, gaseous fuel or a fuel vapor/air mixture $K_{gasf}$, $K_{gasf'}$ for effectuating the purging of antechamber(s) 32 within fuel supply system 100.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel supply system for an active purging of at least one antechamber of a spark-ignition internal combustion engine using a gaseous fuel, the internal combustion engine comprising at least one main combustion chamber, which is connected to at least one antechamber at least on a fuel side,
wherein an evaporator is disposed upstream from the at least one antechamber, and
wherein the evaporator is arranged between a high-pressure pump and the at least one antechamber for supplying the at least one antechamber with gaseous fuel, the high-pressure pump also being used to supply the at least one main combustion chamber with liquid fuel so that a supply line to the evaporator branches from the supply line to the at least one main combustion chamber downstream from the high-pressure pump.

2. The fuel supply system according to claim 1, wherein the evaporator comprises a heating apparatus for evaporating the liquid fuel or is connected to a heating apparatus for supplying heat.

3. The fuel supply system according to claim 2, wherein the evaporator is provided with a separate heating apparatus.

4. The fuel supply system according to claim 2, wherein the evaporator is coupled into a preheating apparatus of the internal combustion engine for a cold start.

5. The fuel supply system according to claim 2, wherein the evaporator is designed in the form of a heat exchanger, the heat being removed from a cooling water of the internal combustion engine and supplied to the evaporator.

6. A fuel supply system for an active purging of at least one antechamber of a spark-ignition internal combustion engine using a gaseous fuel, the internal combustion engine comprising at least one main combustion chamber, which is connected to at least one antechamber at least on a fuel side,
wherein an evaporator is disposed upstream from the at least one antechamber, and
wherein the evaporator is disposed between a feed pump for exclusively supplying the at least one antechamber with gaseous fuel and the at least one antechamber, the fuel supply system further comprising a high-pressure pump for exclusively supplying the at least one main combustion chamber with liquid fuel.

7. The fuel supply system according to claim 6, wherein the evaporator comprises a heating apparatus for evaporating the liquid fuel or is connected to a heating apparatus for supplying heat.

8. A fuel supply system for an active purging of at least one antechamber of a spark-ignition internal combustion engine using a gaseous fuel, the internal combustion engine comprising at least one main combustion chamber, which is connected to at least one antechamber at least on a fuel side,
wherein an evaporator is disposed upstream from the at least one antechamber and a regulating mixing valve is disposed between the evaporator and the at least one antechamber, via which a further gaseous fluid, in particular air, is supplied to the gaseous fuel evaporated in the evaporator so that either unmixed gaseous fuel or a fuel vapor/air mixture is supplied to the at least one antechamber in a predefinable ratio.

9. A method for the active purging of at least one antechamber of a spark-ignition internal combustion engine using a gaseous fuel, the internal combustion engine comprising at least one main combustion chamber, which is connected to at least one antechamber at least on a fuel side, the method comprising:
supplying fuel to the at least one antechamber; and
evaporating, before the fuel is supplied to the at least one antechamber, liquid fuel in an evaporator, which is disposed upstream from the at least one antechamber,
wherein the evaporator is arranged between a high-pressure pump and the at least one antechamber for supplying the at least one antechamber with gaseous fuel, the high-pressure pump also being used to supply the at least one main combustion chamber with liquid fuel so that a supply line to the evaporator branches from the supply line to the at least one main combustion chamber downstream from the high-pressure pump.

10. A system, comprising:
a spark-ignition internal combustion engine, comprising:
a plurality of main combustion chambers;
a plurality of antechambers, each of the plurality of antechambers being associated with one of the plurality of main combustion chambers; and
a plurality of frequency valves, each of which is connected to one of the plurality of antechambers;
an evaporator disposed upstream from the plurality of antechambers, the evaporator configured to selectively provide gaseous fuel to the plurality of antechambers.

11. The system according to claim 10, further comprising:
a feed pump for exclusively supplying the plurality of antechambers with the gaseous fuel; and
a high-pressure pump for exclusively supplying the plurality of main combustion chambers with liquid fuel.

12. The system according to claim 10, further comprising a feed pump for exclusively supplying the plurality of antechambers with the gaseous fuel.

13. The system according to claim 10, further comprising a high-pressure pump for exclusively supplying the plurality of main combustion chambers with liquid fuel.

14. The system according to claim 10, further comprising a regulating mixing valve disposed between the evaporator and the plurality of frequency valves, the regulating mixing valve configured to mix the gaseous fuel with air.

15. The system according to claim 13, further comprising a plurality of injection valves, each of the plurality of injection valves being associated with one of the plurality of main combustion chambers, configured to inject the liquid fuel into the plurality of main combustion chambers.

16. The system according to claim 10, further comprising:
a tank configured to supply liquid fuel to the evaporator; and
a return valve configured to return liquid fuel to the tank.

17. The system according to claim 10, further comprising a regulating mixing valve disposed between the evaporator and the plurality of antechambers, via which a further gaseous fluid is supplied to the gaseous fuel evaporated in the evaporator so that either unmixed gaseous fuel or a gaseous fuel mixture is supplied to the plurality of antechambers.

18. The system according to claim 10, further comprising a regulating mixing valve disposed between the evaporator and the plurality of antechambers, via which air is supplied to the gaseous fuel evaporated in the evaporator so that evaporator is configured to supply unmixed gaseous fuel to the plurality of antechambers and is configured to supply a mixture of gaseous fuel and air to the plurality of antechambers.

19. A method for the active purging of at least one antechamber of a spark-ignition internal combustion engine using a gaseous fuel, the internal combustion engine comprising at least one main combustion chamber, which is connected to at least one antechamber at least on a fuel side, the method comprising:
supplying fuel to the at least one antechamber; and
evaporating, before the fuel is supplied to the at least one antechamber, liquid fuel in an evaporator, which is disposed upstream from the at least one antechamber,
wherein the evaporator is disposed between a feed pump for exclusively supplying the at least one antechamber with gaseous fuel and the at least one antechamber, the fuel supply system further comprising a high-pressure pump for exclusively supplying the at least one main combustion chamber with liquid fuel.

* * * * *